(No Model.)
C. E. PERRY & H. H. KIMBALL.
WRIST PIN LUBRICATOR.
No. 278,817. Patented June 5, 1883.
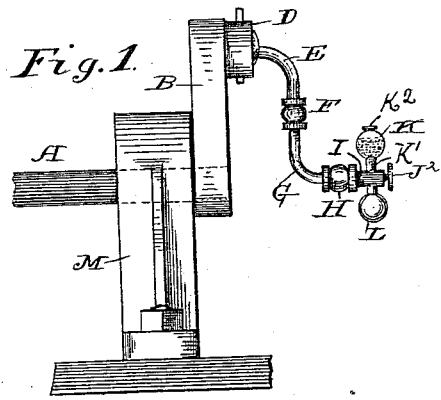
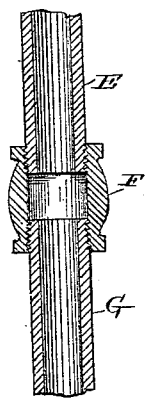
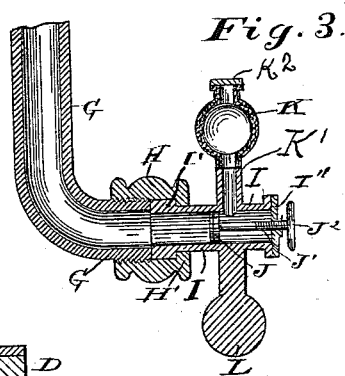
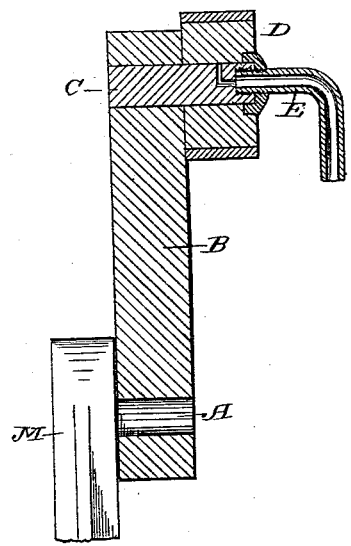
WITNESSES.
J. C. Turner
Theo. Mungen.
INVENTOR.
Charles E. Perry & Henry H. Kimball
By Frank A. Fouts atty.

UNITED STATES PATENT OFFICE.

CHARLES E. PERRY AND HENRY H. KIMBALL, OF BLOOMINGTON, ILLINOIS.

WRIST-PIN LUBRICATOR.

SPECIFICATION forming part of Letters Patent No. 278,817, dated June 5, 1883.

Application filed February 5, 1883. (No model.)

*To all whom it may concern:*

Be it known that we, CHAS. E. PERRY and HENRY H. KIMBALL, both citizens of the United States, residing at Bloomington, in the county of McLean and State of Illinois, have invented certain new and useful Improvements in Wrist-Pin Lubricators; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to a lubricator for the wrist-pins of stationary engines and the like; and the novelty consists in the construction and arrangement of parts, as will be more fully hereinafter set forth, and specifically pointed out in the claims.

The invention is fully illustrated in the accompanying drawings, which form a part of this specification, and in which Figure 1 represents a rear elevation of our invention; Fig. 2, a sectional view of a crank-arm and an oil-pipe communicating therewith, a section of the frame being also shown in this view. Fig. 3 is a section of the outer end of the oil-pipe provided with an oil-cup, and having a weight adapted to maintain a perpendicular at all times during the revolutions of the main shaft; and Fig. 4, a sectional view of the right-and-left-threaded connecting-joint of the pipe.

Referring to the drawings, in which similar letters indicate like parts in all the figures, A indicates the main shaft of a stationary engine, and B is the crank-arm, provided with wrist-pin C.

D is a rear view in Fig. 1 and a cross-section in Fig. 2 of the main rod communicating with the cross-head of the engine.

E indicates a pipe provided with a threaded end, which communicates with a threaded opening in the end of the wrist-pin, as shown in Fig. 2, said wrist-pin being provided with an outside opening communicating with a right-angled opening which connects with the bearing of the wrist-pin, all of which is particularly shown in Fig. 2.

F is a right-and-left joint connecting pipes E and G. H is a joint provided with a threaded recess adapted to engage the lower end of the pipe G.

H' represents a shoulder on joint H, adapted to engage and secure the shoulder I' on the inner end of the pipe I.

J is a valve or piston on the inner end of the rod J', said rod near its outer end being provided with a threaded surface, and said rod J' is provided with a hand-wheel, $J^2$, as shown.

I'' designates a cup provided with a threaded opening, said cup being secured on the outer end of the pipe I. The threads on the rod J' engage the threads in the cup I'', whereby the piston J may be regulated or adjusted longitudinally in the pipe I.

K indicates an oil-cup arranged on the upper part of a pipe, K', and $K^2$ is a cap on said oil-cup.

L represents a weight rigidly connected to and appended from the pipe I, and said weight is adapted to maintain a perpendicular of the cup K at all times, notwithstanding the revolutions of the crank B and the pipes E G, rigidly connected thereto. The shoulder I' on the inner end of the pipe I is loosely secured in joint H. The weight L and cup K being rigidly united to pipe I, it follows that said weight and cup must always maintain a perpendicular.

The operation of the device is obvious. The oil-cup K being filled, and the piston J being drawn out by turning the hand-wheel $J^2$, the oil flows into the pipe I and into the pipes G E. When the engine is started the oil finds its way through the said pipes G E into the opening in the wrist-pin, and thence into the journal-bearings of said wrist-pin, whereby it is continuously lubricated, as will be readily understood.

We are aware that prior to our invention a weight and oil-cup have been loosely mounted upon a plug, said plug and the wrist-pin being connected by pipe, whereby the plug is maintained in a position concentric with the crank-shaft. We therefore do not claim such mechanism, broadly; but What we do claim, and desire to secure by Letters Patent, is—

1. The combination of the cup K, weight

L, and loosely-journaled pipe I with the pipes E G, and the wrist-pin C, having angular opening connecting with the journal, as specified.

2. In combination with the pipes E G of a self-lubricator, the oil-cup K, weight L, loosely-journaled pipe I, piston J, and right-and-left joint F, as and for the purposes set forth.

In testimony whereof we affix our signatures in presence of two witnesses.

CHARLES E. PERRY.
HENRY H. KIMBALL.

Witnesses:
JNO. T. LILLARD,
H. E. GAPEN.